United States Patent [19]

Suzuki

[11] Patent Number: 5,848,296
[45] Date of Patent: Dec. 8, 1998

[54] METHOD FOR STARTING UP RECORDING AND REPRODUCING APPARATUS BY ALLOWING THE HOST COMPUTER TO RECEIVE NECESSARY PROGRAMS FROM RECORDING AND REPRODUCING APPARATUS ILUSTRATIVELY UPON POWER-UP

[75] Inventor: Katsuji Suzuki, Fukushima-ken, Japan

[73] Assignee: Alps Electric Co., Ltd., Tokyo, Japan

[21] Appl. No.: 616,400

[22] Filed: Mar. 13, 1996

[30] Foreign Application Priority Data

Mar. 20, 1995 [JP] Japan ................................ 7-060840

[51] Int. Cl.⁶ .................................................. G06F 13/00
[52] U.S. Cl. ............................................ 395/830; 395/652
[58] Field of Search .................................. 395/712, 652, 395/830

[56] References Cited

U.S. PATENT DOCUMENTS 5,410,707 4/1995 Bell ........................................ 395/652
5,471,674 11/1995 Stewart .................................. 395/652
5,664,194 9/1997 Paulsen .................................. 395/712

FOREIGN PATENT DOCUMENTS 1230120 9/1989 Japan .
3-6646 (A) 1/1991 Japan .

*Primary Examiner*—Thomas C. Lee
*Assistant Examiner*—David Ton
*Attorney, Agent, or Firm*—Brinks Hofer Gilson & Lione

[57] ABSTRACT

A method for starting up a recording and reproducing apparatus connected to a host computer. The method involves allowing the host computer to receive necessary programs from the recording and reproducing apparatus illustratively upon power-up, whereby the apparatus is started up. When the recording and reproducing apparatus is powered, the controller of the host computer transfers first a bootstrap program and then an initial program loader from the apparatus to the host computer, and loads the transferred programs into a RAM of the latter for startup operation.

2 Claims, 2 Drawing Sheets

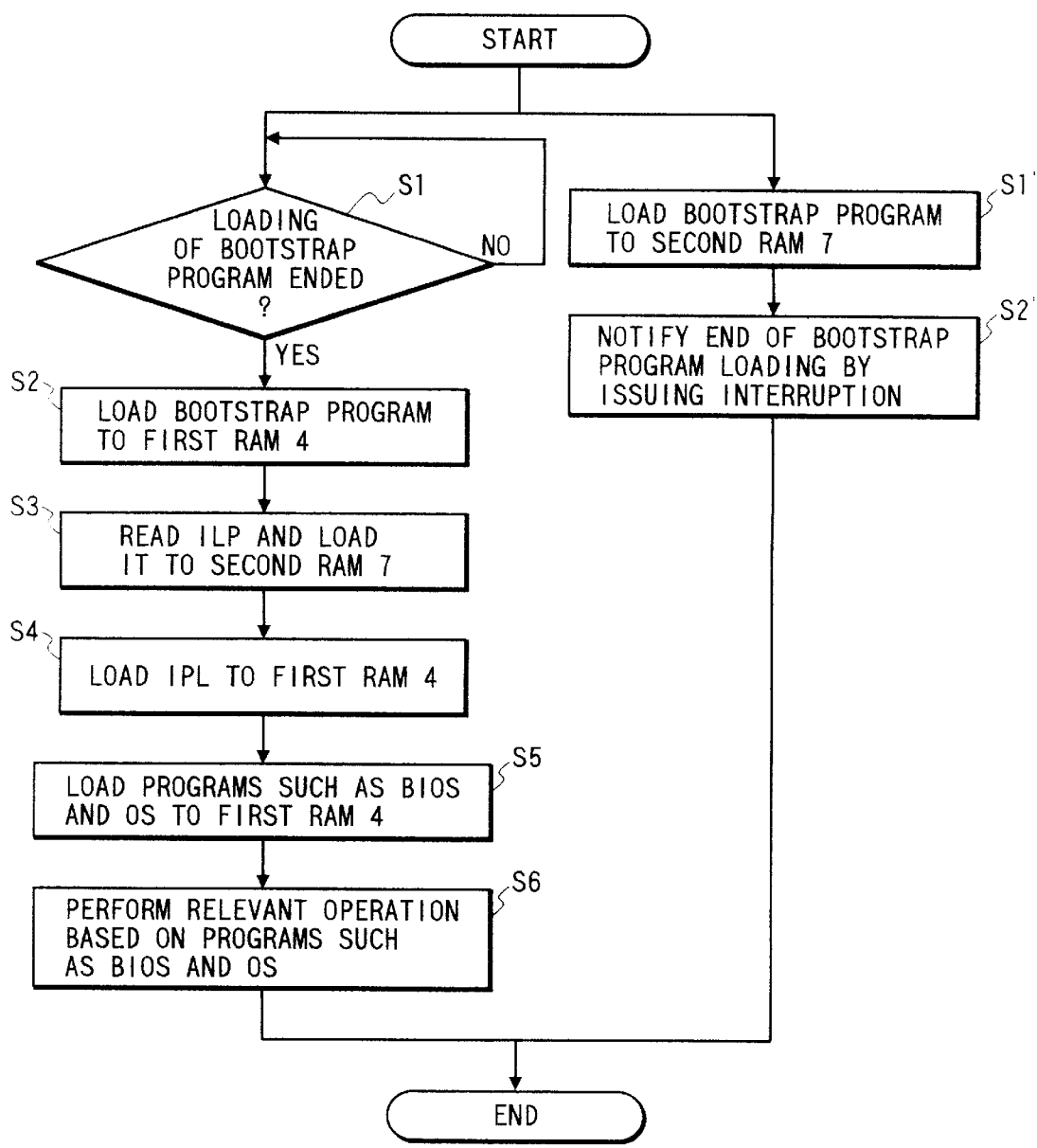

METHOD FOR STARTING UP RECORDING AND REPRODUCING APPARATUS BY ALLOWING THE HOST COMPUTER TO RECEIVE NECESSARY PROGRAMS FROM RECORDING AND REPRODUCING APPARATUS ILUSTRATIVELY UPON POWER-UP

BACK OF THE INVENTION

1. Field of the Invention

The present invention relates to a method for starting up a recording and reproducing apparatus for use with a host computer. More particularly, the invention relates to a data transmission method comprising the steps of causing the host computer to receive a bootstrap program from the recording and reproducing apparatus illustratively when the apparatus is powered and allowing the host computer to receive an initial program loader (IPL) from a disk of the recording and reproducing apparatus in accordance with the received bootstrap program.

2. Description of the Related Art

Recording and reproducing apparatuses (typically represented by magnetic disk units) are known generally to operate in conjunction with a host computer connected thereto. That is, the host computer controls the workings of the connected magnetic disk unit.

In a conventional setup where such a magnetic disk unit is included, a read only memory (ROM) on the side of the host computer contains a bootstrap (i.e., startup) program required to start up the magnetic disk unit. When the magnetic disk unit to be activated, the host computer causes the bootstrap program in its ROM to read an initial program loader from a magnetic disk of the magnetic disk unit. The magnetic disk unit is then started up in accordance with the initial program loader thus read out. Thereafter, the magnetic disk unit is operated as needed.

As outlined, the conventionally furnished magnetic disk unit is started up illustratively upon power-up by the bootstrap program from the ROM of the host computer as well as by the initial program loader read from any one of the magnetic disks constituting the disk unit. After this, the magnetic disk unit is operated as required under host computer control. Some host computers, however, have no ROM arrangement. Such host computers include those incorporated in computer game machines.

There may occur circumstances in which without the ROM containing the bootstrap program, those host computers are nevertheless connected to the magnetic disk unit. In such cases, the host computer is incapable of starting up the connected magnetic disk unit illustratively upon the latter's power-up.

Even if the host computer does incorporate a ROM, it may not be technically feasible due to a limited memory capacity or economically practical for the ROM to accommodate all programs needed to start up or otherwise operate all peripheral devices (including the recording and reproducing apparatus) connected to the host computer. Other host computers may have a ROM but the memory does not include the bootstrap program required for the connected peripheral device (magnetic disk unit in this case). In that case, the inability of the host computer normally to start up the magnetic disk unit persists.

SUMMARY OF THE INVENTION

It is therefore an object of the present invention to overcome the above deficiencies of the prior art and to provide a method for starting up a recording and reproducing apparatus connected to a host computer, the method allowing the host computer to acquire from the recording and reproducing apparatus necessary programs to start up the apparatus regardless of a ROM provision on the part of the host computer.

In carrying out the invention and according to one aspect thereof, there is provided a method for starting up a recording and reproducing apparatus connected to a host computer. The host computer comprises at least a first controller and a first RAM, whereas the recording and reproducing apparatus includes at least a second controller, a ROM accommodating a bootstrap program, a second RAM and a disk drive for driving disks having an initial program loader recorded thereon. The method comprises the step of causing the second controller of the recording and reproducing apparatus to load the bootstrap program from the ROM into the second RAM typically when the recording and reproducing apparatus is powered. At this point, according to the method, the second controller preferably notifies the host computer that the loading of the bootstrap program into the second RAM has been completed. The method further comprises the step of causing the first controller on the side of the host computer, upon receipt of the load completion notice, to transfer the bootstrap program from the second RAM of the recording and reproducing apparatus to the host computer and to load the transferred bootstrap program into the first RAM of the host computer. In accordance with the bootstrap program loaded in the first RAM, the initial program loader is then read from the disks of the recording and reproducing apparatus and loaded into the first RAM of the host computer via the second RAM of the apparatus, whereby the recording and reproducing apparatus is started up.

As outlined and according to the invention, first the bootstrap program and then the initial program loader are transferred from the recording and reproducing apparatus to the host computer and loaded into the first RAM of the latter. With the bootstrap program and initial program loader thus placed in the first RAM of the host computer, the host computer can start up the connected recording and reproducing apparatus normally even if the host computer has no ROM or if its built-in ROM does not include the bootstrap program. When started up in this manner, the recording and reproducing apparatus can be operated as required thereafter under host computer control.

These and other objects, features and advantages of the invention will become more apparent upon a reading of the following description and appended drawings.

BRIEF DESCRIPTION OF THE DRAWINGS

FIG. 2 is a flowchart of steps for starting up the recording and reproducing apparatus shown in FIG. 1 in accordance with the inventive method.

DESCRIPTION OF THE PREFERRED EMBODIMENT

Figure 1:
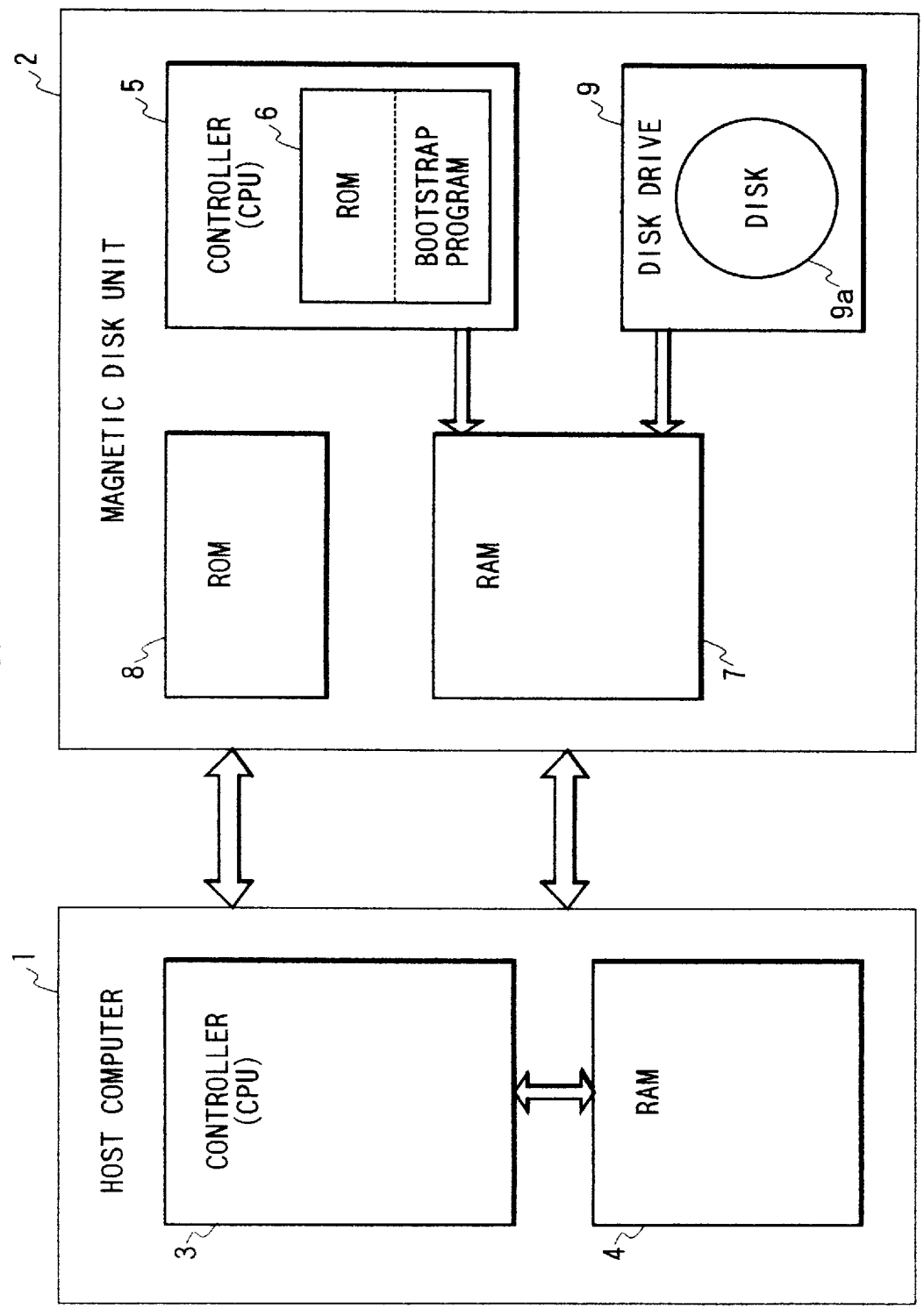
FIG. 1 is a block diagram of a recording and reproducing apparatus to which the method of the invention is illustratively applied.

A preferred embodiment of the invention will now be described in detail with reference to the accompanying drawings. FIG. 1 is a block diagram of a typical recording and reproducing apparatus to which the method of the invention is illustratively applied. The apparatus in this example is a magnetic disk unit.

In FIG. 1, the magnetic disk unit 2 is connected to a host computer 1 so that exchanges of various data will take place therebetween. The host computer 1 comprises at least a central processing unit (CPU, hereinafter called the first controller) 3 and a random access memory (RAM, called the first RAM) 4. The magnetic disk unit 2 includes at least a central processing unit (CPU, called the second controller) 5, a read only memory (ROM, called the first ROM) 6 incorporated in the second controller 5, a random access memory (RAM, called the second RAM) 7 in the ASIC (application specific integrated circuit), a read only memory (ROM, called the second ROM) 8 also in the ASIC, and a disk drive 9 for rotating magnetic disks 9a. The first ROM 6 accommodates at least a bootstrap program for starting up the magnetic disk unit 2. The magnetic disks 9a have various data and an initial program loader (IPL) for the magnetic disk unit 2 recorded thereon.

FIG. 2 is a flowchart of steps for starting up the recording and reproducing apparatus (i.e., magnetic disk unit) shown in FIG. 1 in accordance with the inventive method. In FIG. 2, the steps shown on the left-hand side indicate the flow of operations on the side of the host computer 1; the right-hand side steps represent the flow of operations of the magnetic disk unit 2.

How the magnetic disk unit 2 of FIG. 1 is started up will now be described with reference to the flowchart of FIG. 2. In step S1, when the host computer 1 and magnetic disk unit 2 are powered, the first controller 3 of the host computer 1 fetches an instruction from the second ROM 8 of the magnetic disk unit 2. With the instruction fetched, the first controller 3 waits for the bootstrap program to be loaded into the second RAM 7.

Meanwhile in step S1', when the host computer 1 and magnetic disk unit 2 are powered, the second controller 5 of the magnetic disk unit 2 reads the bootstrap program from the first ROM 6 and loads it into the second RAM 7.

In step S2', the second controller 5 of the magnetic disk unit 2, upon completion of the loading of the bootstrap program into the second RAM 7, issues an interruption to the host computer 1 notifying it of the completion of bootstrap program loading. This completes the flow of startup operations on the part of the magnetic disk unit 2.

In step S2, the first controller 3 of the host computer 1 is notified by the magnetic disk unit 2 that loading of the bootstrap program from the magnetic disk unit 2 has been completed. Upon receipt of the load-complete notice, the first controller 3 interrupts its control operation to accommodate the notification. By so doing, the first controller 3 loads the bootstrap program from the second RAM 7 of the magnetic disk unit 2 into the first RAM 4 of the host computer 1 in accordance with the bootstrap program (specifically by fetching instructions therefrom).

In step S3 that follows, the first controller 3 of the host computer 1 reads the IPL (initial program loader) from the magnetic disks 9a in the disk drive 9 on the basis of the bootstrap program placed in the first RAM 4. The IPL thus read is loaded into the second RAM 7 of the magnetic disk unit 2.

In step S4, the first controller 3 of the host computer 1 loads the IPL from the second RAM 7 into the first RAM 4 of the host computer 1 in accordance with the bootstrap program placed in the first RAM 4.

In step S5, the first controller 3 of the host computer 1 reads various programs such as a BIOS (basic input/output system) and the operating system (OS) from the magnetic disks 9a based on the IPL placed in the first RAM 4. These programs are transferred to and loaded into the first RAM 4 of the host computer 1.

Finally in step S6, the first controller 3 of the host computer 1 operates the magnetic disk unit 2 as required according to the programs such as the BIOS and OS loaded into the first RAM 4. This completes the flow of startup operations on the part of the host computer 1.

According to the invention as embodied above, the first controller 3 of the host computer 1 transfers first the bootstrap program and then the initial program loader (IPL) from the magnetic disk unit 2 to the host computer 1. The transferred bootstrap program and IPL are loaded into the first RAM 4 of the host computer 1. Thus where the host computer 1 has no ROM incorporated therein or has a built-in ROM which does not include a bootstrap program for starting up the magnetic disk unit 2, such a host computer can still be connected to the magnetic disk unit 2 in such a manner the latter is normally started up and operated as required.

Although the embodiment above assumes that the recording and reproducing apparatus is a magnetic disk unit 2, this is not limitative of the invention. The invention may be applied to any apparatus which can record and reproduce data and which is connectable to a host computer for controlled operation.

While a preferred embodiment of the invention has been described using specific terms, such description is for illustrative purposes only, and it is to be understood that changes and variations may be made without departing from the spirit and scope of the following claims.

What is claimed is:

1. A method for starting up a recording and reproducing apparatus, said recording and reproducing apparatus being connected to a host computer, said host computer comprising at least a first controller and a first RAM, said recording and reproducing apparatus comprising at least a second controller, a ROM accommodating a bootstrap program, a second RAM and a disk drive for driving disks having an initial program loader recorded thereon; said method comprising the steps of:

causing said second controller to load said bootstrap program from said ROM into said second RAM when said recording and reproducing apparatus is powered;

notifying said host computer by said second controller of completion of the loading of said bootstrap program form said ROM into said second RAM;

causing said first controller to load said bootstrap program from said second RAM into said first RAM in accordance with said bootstrap program; and loading said initial program loader from said disks into said first RAM via said second RAM on the basis of said bootstrap program loaded into said first RAM, whereby said recording and reproducing apparatus is started up.

2. A method for starting up a recording and reproducing apparatus according to claim 1, further comprising the step of interrupting the operation of said first controller to accommodate notification of the completed loading of said bootstrap program.

\* \* \* \* \*

UNITED STATES PATENT AND TRADEMARK OFFICE
CERTIFICATE OF CORRECTION

PATENT NO.   : 5,848,296
DATED        : December 8, 1998
INVENTOR(S)  : Katsuji Suzuki It is certified that error appears in the above-indentified patent and that said Letters Patent is hereby corrected as shown below:

<u>In the Claims</u>

In Claim 1, line 15, replace "form" with --from--.

In Claim 2, line 4, after "accommodate" insert --the--.

Signed and Sealed this

Twenty-seventh Day of July, 1999

Attest:

Q. TODD DICKINSON

*Attesting Officer*    *Acting Commissioner of Patents and Trademarks*